July 22, 1958     G. E. FRANCK     2,843,924
TUBE CLAMPING MEANS
Filed Dec. 7, 1953
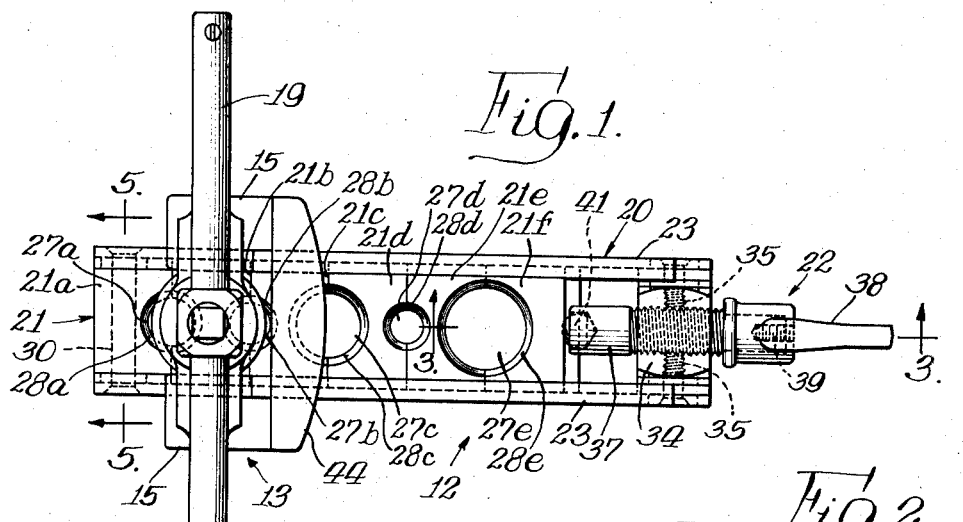
INVENTOR.
George E. Franck,
BY United States Patent Office 2,843,924
Patented July 22, 1958

2,843,924

TUBE CLAMPING MEANS

George E. Franck, Riverside, Ill., assignor to The Imperial Brass Manufacturing Company, a corporation of Illinois Application December 7, 1953, Serial No. 396,649

1 Claim. (Cl. 29—284)

This invention relates to clamping means and more particularly to a clamping means of the type having rigid side bars enclosing a series of longitudinally movable tube clamping blocks for providing a plurality of aligned tube receiving bores.

It is the principal object to provide a new and improved tube clamping means.

A further object is to provide side bars having a novel structure so as to prevent the edges of the tube clamping blocks from contacting any tube flaring or other device which might be used in conjunction with the tube clamping means so as to eliminate damage to the block edges.

A still further object is to provide an improved connection between the screw clamping device and the carrier so as to insure proper and certain longitudinal thrust of the clamping device upon the blocks held within the carrier.

Other objects and advantages will become apparent from the following detailed description taken in connection with the accompanying drawings which:

Fig. 1 is a top plan view of the tube clamping means shown as forming part of a tube flaring device;

Fig. 2 is an end elevational view of the tube clamping means of Fig. 1;

Fig. 3 is a fragmentary longitudinal section through the tube clamping means taken along the line 3—3 of Fig. 1;

Fig. 4 is a fragmentary section of the tube clamping means taken along the line 4—4 of Fig. 3; and Fig. 5 is a transverse section of the tube clamping means taken along line 5—5 of Fig. 1.

While this invention is susceptible of embodiment in many different forms, there is shown in the drawings and will herein be described in detail one specific embodiment, with the understanding that the present disclosure is to be considered as an exemplification of the principles of the invention, and is not intended to limit the invention to the embodiment illustrated. The scope of the invention will be pointed out in the appended claim.

One of the uses of the tube clamping means forming the subject matter of this invention is shown in Figs. 1 and 2, in which it is embodied in a tube flaring device which includes tube clamping means generally designated 12 and tube flaring means generally designated 13.

The tube flaring means 13 includes a yoke 14 having spaced parallel legs 15 the inner faces of which are provided with annular channels 16 which make a close sliding fit on the tube clamping means 12 to allow longitudinal movement of the yoke thereon. A threaded stud 17 which extends through a threaded aperture in the top of the yoke has a conical tube flaring head 18 at its lower end and a handle 19 at its upper end.

As best seen in Fig. 1, the tube clamping means comprises generally an elongated carrier 20 within which is mounted a line of tube clamping blocks indicated generally at 21, and screw clamp means indicated generally at 22 on one end of the carrier for applying a longitudinal thrust to the line of clamping blocks 21.

The carrier 20 consists of a pair of longitudinal channel members 23 having web portions 24 provided with longitudinal inturned flanges 25 along both margins. The channel members 23 fit in the recesses 16 in the yoke arms 15. The channel members 23 are formed from sheet metal, and the inturned longitudinal flanges 25 thereof fit into complementary recesses 26 formed in the longitudinal edge portions of the tube clamping blocks comprising the line 21.

Conventional tube clamp carrriers have heretofore been made considerably narrower than the tube clamping blocks and have fitted into channels in the side walls of the blocks, and because of the nature of the stresses to which such members are subjected it was necessary to form the carrier from a pair of bar members having sufficient structural strength to withstand the anticipated stresses. The present carrier 20 may be stamped out of sheet metal, which can readily withstand the longitudinal tension to which the carrier is subjected in use. This is very important because of the relatively large supply of sheet metal which is available, and its low cost; and in particular its relative availablility even when there is a critical materials shortage such as occurs in a war emergency.

Two important additional advantages to the channel shape of the carrier 20 are:

(1) The constructions heretofore known to applicant employed rectangular carrier members which lay in channels extending nearly from top to bottom of each side of the clamping blocks, so that the blocks had relatively thin side walls. The present structure with channels along the edges of the blocks is much stronger; and (2) The channels 23 form a protective covering completely shielding the walls of the clamping blocks from whatever tool, such as the flaring tool 11, is being used with the clamping device.

The line 21 of tube clamping blocks includes blocks 21a–f, each of which is provided with a semicircular groove which is complementary to a groove in the next adjacent block so that there is a substantially circular tube receiving orifice at the junction between each pair of blocks, such orifices being indicated by the reference numerals 27a–e, inclusive, and said orifices 27a–e are provided in their upper margins with chamfers 28a–e, respectively, to receive the end of the conical tube flaring tool 18. The dimensions of the clamping blocks 21a–f, and in particular the depths of the longitudinal recesses 26, are such as to permit the blocks to slide freely in the carrier 20 without side play. In order that the blocks may be readily interchangeable all are made the same size longitudinally of the carrier, and in order to accomplish this, the smaller clamping orifices are alternated with the larger ones as seen in Fig. 1 so that the wall between any adjacent orifices is always of adequate thickness. Furthermore, the orifices 27a–e are slightly out of round, with their transverse dimension a few thousandths of an inch greater than their longitudinal dimension so as to prevent scoring of a tube along the lines of juncture of the complementary recesses which form the orifice. The chamfers 28a–e vary in depth directly with the diameter of each orifice so that the largest orifice has the deepest countersink, etc.

As best seen in Fig. 5 the channels 23 where they flank the block 21a are pierced and internally flared to provide bearing members 29 which project into lateral recesses in the block 21a, and said block has a transverse aperture in alignment with the bearing members to receive a retaining pin, or rivet 30 which serves to secure together the block 21a and the two channel members 23 forming the carrier 20. The bearing members 29 which surround the end portions of the pin 30 serve to strengthen and reinforce the pin 30, which serves as a cross member to receive the longitudinal thrust when a tube is clamped in one of the clamping orifices of the tool.

Referring now particularly to Figs. 3 and 4, the screw clamping means 22 is constructed for pivotal movement so that it may be moved from the operating position shown in Figs. 1, 3 and 4 to a transverse position which affords greater clearance for spreading the clamping blocks to remove a tube therefrom. The channel members 23 are provided with aligned apertures to receive bearing rings 31 which are permanently secured to the channel members 23 as by spot welds 32, and the bearing rings have circular internal bosses 33 to receive a trunnion 34 which is held in place by pivot screws 35 so that it may rotate about the bosses 33. The pivot screws are inserted through the bearing rings 31 and the trunnion 34 so that their ends are flush with a central bore 36 in the trunnion, and thereafter a tap is run through the trunnion bore 36 to cut a thread in the trunnion bore and thread the ends of the pivot screws 35. Thus, when clamping screw 37 is screwed through the trunnion 34 the pivot screws 35 are first threaded to the clamping screw 37 so that the pivotal movement of the trunnion will not loosen them. Manipulation of the clamping screw 37 is accomplished by means of a finger piece 38 which slides onto an unthreaded end portion of the clamping bolt 37 and is held in place by a set screw 39. At the inner end of the clamping screw 37 is a well 40 to receive a ball bearing 41 which may seat in an indentation 42 in the center of the end face of clamping block 21f so as to relieve wear on the end of the adjusting bolt 37 when it is tightened to clamp the blocks and to positively center the clamping thrust on the line of blocks. A stop shoulder 43 projects longitudinally from the block 21f, as seen in Fig. 3, to fix the lateral position of the screw clamping means 22 with the ball bearing 41 aligned with the indentation 42.

In the operation of the tube clamping means in conjunction with a tube flaring device 12, the clamping screw 37 is turned to release the longitudinal thrust on the blocks and the entire apparatus 22 may, if desired, be pivoted to permit separation of the blocks 25 and then a tube of the proper size may be inserted in one of the recesses 33.

On the side of the yoke 14 is a flare gauge 44 which is used to gauge the projection of a tube above the clamping blocks 21 so that a uniform flare is produced in every operation. The yoke is first moved to position the flare gauge over a tube, which has its end abutted against the flare gauge before it is clamped in the blocks; and the yoke is then slid over to align the conical flaring head 18 with the end of the tube. By screwing the threaded stud 17 inwardly the conical flaring head 18 flares the projecting upper end of the tool into the chamfer at the upper margin of the tube clamping orifice so as to flare the tube.

I claim:

In a tube clamping means having a pair of channel-like members forming a carrier provided with a cross member at one end and a pair of tube clamping blocks at least one of which is slidably supported in the carrier, screw means for forcing said blocks together to clamp a tube therebetween comprising: a pair of aligned annular bearing members fixedly secured in openings in the sides of the carrier, each of said bearing members having an axial length greater than the thickness of the channel-like members; a screw pivotally mounted in each of said bearing members, said screws having threaded end portions terminating in lateral end surfaces; a trunnion pivotally mounted on said bearing members, said trunnion having a longitudinal bore the surface of which is flush with the ends of the screws; a thread cut in said bore and on the lateral end surfaces of said screws; and a threaded bolt extending through said bore so that its inner end may bear on one of the tube clamping blocks, the thread thereof engaging the threaded end surface of the screws to lock the screws against withdrawal from the bearing members.

References Cited in the file of this patent

UNITED STATES PATENTS

| | | |
|---|---|---|
| 2,258,841 | Biro | Oct. 14, 1941 |
| 2,415,520 | Obecny | Feb. 11, 1947 |
| 2,424,871 | Wenk et al. | July 29, 1947 |
| 2,483,982 | Paquin | Oct. 4, 1949 |
| 2,505,665 | Franck | Apr. 25, 1950 |
| 2,505,666 | Franck | Apr. 25, 1950 |
| 2,526,210 | Edelmann | Oct. 17, 1950 |
| 2,654,414 | Tomarin | Oct. 6, 1953 |
| 2,660,141 | Thomas | Nov. 24, 1953 |

FOREIGN PATENTS

| | | |
|---|---|---|
| 538,730 | Great Britain | Aug. 14, 1941 |